United States Patent
Tortosa et al.

(10) Patent No.: US 12,096,216 B2
(45) Date of Patent: Sep. 17, 2024

(54) TELECOMMUNICATION INFORMATION COLLECTION WITH SEPARATE CERTIFICATION

(71) Applicant: International Business Machines Corporation, Armonk, NY (US)

(72) Inventors: Andrea Tortosa, Rome (IT); Vinicio Bombacino, Rome (IT)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 17/552,008

(22) Filed: Dec. 15, 2021

(65) Prior Publication Data

US 2023/0188986 A1 Jun. 15, 2023

(51) Int. Cl.
| | |
|---|---|
| *H04W 12/069* | (2021.01) |
| *H04L 9/32* | (2006.01) |
| *H04W 4/02* | (2018.01) |
| *H04W 4/38* | (2018.01) |
| *H04W 12/03* | (2021.01) |

(52) U.S. Cl.
CPC ......... *H04W 12/069* (2021.01); *H04L 9/3213* (2013.01); *H04W 4/025* (2013.01); *H04W 4/38* (2018.02); *H04W 12/03* (2021.01)

(58) Field of Classification Search
CPC ..... H04W 12/069; H04W 4/38; H04W 4/025; H04W 12/03; H04L 9/3213
See application file for complete search history.

(56) References Cited

U.S. PATENT DOCUMENTS

| | | | |
|---|---|---|---|
| 8,413,221 B2 | 4/2013 | Kaliski et al. | |
| 2012/0159577 A1 | 6/2012 | Belinkiy et al. | |
| 2015/0081324 A1 | 3/2015 | Adjaoute | |
| 2018/0052970 A1 | 2/2018 | Boss et al. | |
| 2018/0199205 A1* | 7/2018 | Zhu | H04L 9/0825 |
| 2021/0365445 A1 | 11/2021 | Robell et al. | |
| 2021/0385085 A1* | 12/2021 | Wang | H04L 9/12 |
| 2022/0051808 A1* | 2/2022 | Miettinen | G16H 50/80 |
| 2023/0188981 A1* | 6/2023 | Bora | H04W 12/041 |
| | | | 380/270 |

(Continued)

FOREIGN PATENT DOCUMENTS

WO    2021108003 A1    6/2021

OTHER PUBLICATIONS

Nagaraju et al., "Trusted framework for online banking in public cloud using multi-factor authentication and privacy protection gateway," Springer, Journal of Cloud Computing: Advances, Systems and Applications, Dec. 2015, 23 pages, DOI 10.1186/s13677-015-0046-4, https://journalofcloudcomputing.springeropen.com/articles/10.1186/s13677-015-0046-4.

(Continued)

*Primary Examiner* — Ernest G Tacsik
(74) *Attorney, Agent, or Firm* — James L. Olsen (57) ABSTRACT

A token is transmitted to a certification computing system, and a piece of information is received in association with the token from a source computing system. The piece of information is accepted according to the token, which provides a certification relating to the piece of information being granted by a transmission of the token from the certification computing system to the source computing system.

15 Claims, 7 Drawing Sheets

(56) References Cited

U.S. PATENT DOCUMENTS

2023/0326612 A1* 10/2023 Asrari .................. G16H 40/67
705/3

OTHER PUBLICATIONS

Joshi et al., "Anonymous and Confidential Database Securing through Privacy Preserving Update," International Journal of Engineering Research & Technology (IJERT), vol. 5, Issue 01, 2017, 3 pages, https://www.ijert.org/research/anonymous-and-confidential-database-securing-through-privacy-preserving-update-IJERTCONV5IS01090.pdf.

Trombetta et al., "Privacy-Preserving Updates to Confidential and Anonymous Databases," Purdue University, Department of Computer Science, Report No. 07-023, Aug. 2011, 18 pages, https://docs.lib.purdue.edu/cgi/viewcontent.cgi?article=2686&context=cstech.

Li et al., "An Efficient User Authentication and User Anonymity Scheme with Provably Security for IoT-Based Medical Care System," MDPI, Sensors, Jun. 23, 2017, 18 pages, doi: 10.3390/s17071482, https://www.ncbi.nlm.nih.gov/pmc/articles/PMC5551096/.

International Search Report, International Application No. PCT/IB2022/062242, Feb. 23, 2023, 7 pgs.

Sun et al. "Vetting Security and Privacy of Global COVID-19 Contact Tracing," arXiv:2006/10933v3 [cs.CR] Jul. 22, 2020, 13 pgs.

Trieu et al. "Epione: Lightweight Contact Tracing with Strong Privacy," arXiv:2004.13293v3 [cs.CR] May 2, 2020, 32 pgs.

* cited by examiner

TELECOMMUNICATION INFORMATION COLLECTION WITH SEPARATE CERTIFICATION

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to collection of information over a telecommunication network.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of collecting information with separate related certification.

Particularly, an embodiment provides a method for collecting information. The method comprises transmitting a token to a certification computing system, and receiving a piece of information in association with the token from a source computing system. The piece of information is accepted according to a match of the token, which provides a certification relating to the piece of information being granted by a transmission of the token from the certification computing system to the source computing system.

A further aspect provides a computer program for implementing the method.

A further aspect provides a corresponding computer program product.

A further aspect provides a system for implementing the method.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).
Particularly.

DETAILED DESCRIPTION

The present disclosure relates to the information technology field. More specifically, this disclosure relates to collection of information over a telecommunication network.

Collection of information is a commonplace activity over telecommunication networks (e.g., the Internet). Particularly, the information may be uploaded from a number of clients to a server for different purposes. A typical example is in a contact tracing process that is used to detect persons (contacts) who may have come into contact with (infected) persons being infected by a pathogen. Contact tracing processes in a digital context may rely on smartphones of the persons to log (tracing) information that allows tracing the smartphones and—as a result—the corresponding persons. For example, for this purpose it is possible to capture proximity signals exchanged among multiple smartphones, to track locations of the smartphones, to ask the persons to scan identification codes on entering corresponding locations and so on. The smartphone of each infected person may upload the corresponding tracing information (at least in part) to a server of a public health authority. As a result, in a contact tracing of forward type it is possible to find other persons that might have been infected by the infected person; these other persons may then be tested for the infection, so as to isolate the infected persons promptly. This helps the public health authority to reduce the spreading of the infection. In addition or in alternative, in a tracing process of backward type it is possible to reconstruct a chain of the infection up to its origin. This helps the public health authority to isolate a hotspot of the infection. Contact tracing processes have become especially important, because of the rise in frequency of pandemic situations (e.g., Coronavirus disease 2019 caused by severe acute respiratory syndrome coronavirus 2 ("COVID-19")).

In some cases, it is desirable to ensure a relatively high accuracy of the information being collected. For this purpose, it is possible to obtain a certification relating to the information being collected, such as about a condition of corresponding source entities to provide the information. For example, in case of the contact tracing it is important that the tracing information is collected from persons that are actually infected. In fact, any false infected person involves the warning of its contacts uselessly; moreover, massive wrong false infected persons distort statistics about the diffusion of the infection, up to the risk of involving unnecessary restrictions to the population.

However, the certification relating to the collected information may be difficult. Particularly, this happens when the information is to be collected anonymously for various reasons (e.g., medical privacy). For example, in case of the contact tracing privacy and autonomy of the persons involved in the process are serious concerns. In contact tracing processes based on a centralized approach the information being logged by the smartphones is uploaded entirely to the server of the public health authority being responsible of determining the persons who have come into contact with each infected person. However, this may undermine the right to medical confidentiality of the infected persons (for example, not desiring that the contacts thereof be informed of their health condition). Moreover, the tracing information about the persons so collected (and particularly their movements and/or encountered persons) may create a risk of surveillance of the population by the governments (with the possibility that a temporary measure, justified by an emergency situation, might become more pervasive and permanent). All of the above also has psychological consequences, since a corresponding feeling of being controlled may lead the persons to avoid being tested for the infection because of the fear of losing their privacy and autonomy. Conversely, in contact tracing processes based on a decentralized approach the responsibility of processing the tracing information is delegated to the smartphones. For example, each smartphone continually broadcasts random messages and receives random messages that are broadcast by other smartphones around it; both the broadcast (random) messages and the received (random) messages are logged on the smartphone. In case a person results positive to the infection, only the transmitted messages logged on his/her smartphone are uploaded to the server. The server publishes these transmitted messages, so that each smartphone may compare them with its received messages; in case of one or more matches, the smartphone determines that the corresponding person has come into contact with an infected person.

In this case, the persons declaring to be infected are unknown to the public health authority and to the other persons (thereby preserving their privacy and autonomy). However, the public health authority is now unable to verify whether the persons declaring to be infected (anonymously) are actually so, so that any person may declare to be infected untruthfully without any risk of being prosecuted for it.

With reference in particular to FIG. 1A-FIG. 1F, the general principles are shown of the solution according to embodiments of the present disclosure.

Figure 1A:
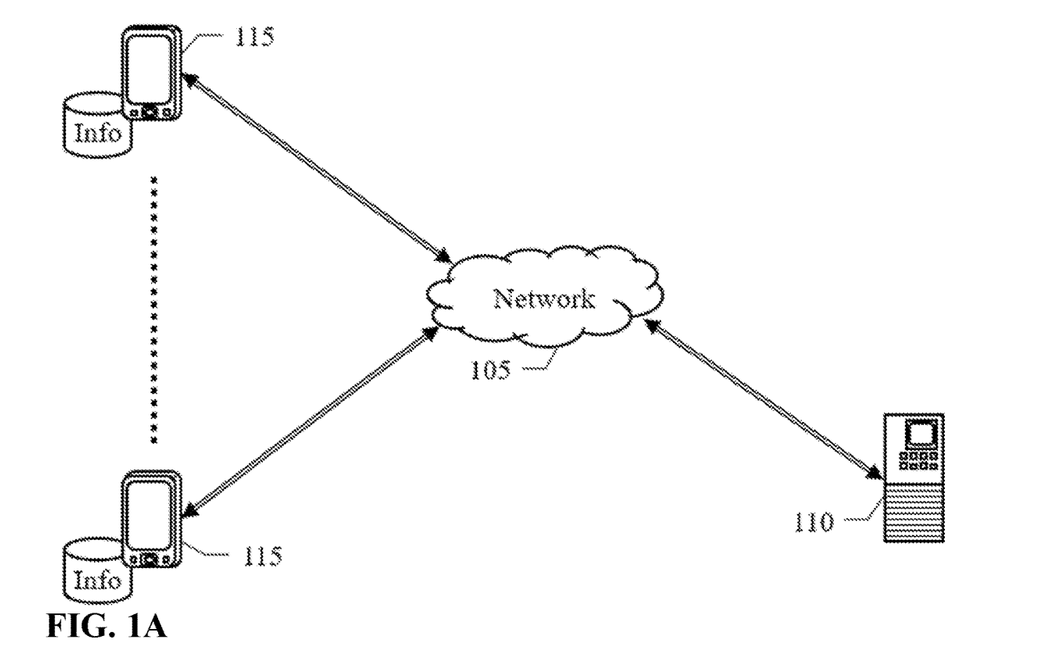
FIG. 1A-FIG. 1F show the general principles of the solution according to some embodiments of the present disclosure.

Starting from FIG. 1A, information is collected over a (telecommunication) network 105. Particularly, the information is collected by a collection computing system, such as a collection server 110 (of a collection entity) from one or more source computing systems, such as source clients 115 (of corresponding source entities). For example, the information is collected in a contact tracing process relating to an infection caused by a pathogen (such as COVID-19). In this case, the collection server 110 belongs to a public health authority (such as of a State) and the source clients 115 are mobile computing devices, such as smartphones, of corresponding persons (of the same State). The smartphones 115 log corresponding (tracing) information that may be used to trace the smartphones 115 of other persons that may have been exposed to the pathogen carried by persons being infected by it (such as based on random messages exchanged among the smartphones 115 when they are in close proximity). The smartphone 115 of any infected person uploads the corresponding tracing information (or at least part of it) to the server 110 for forward and/or backward tracing of the infection (such as for warning the persons that have come into contact with the infected person and/or for identifying an origin of the infection, respectively). Particularly, each infected person uploads the corresponding piece of tracing information anonymously so as to remain unknown to the public health authority (such as being simply indicated by an anonymous code).

Figure 1B:
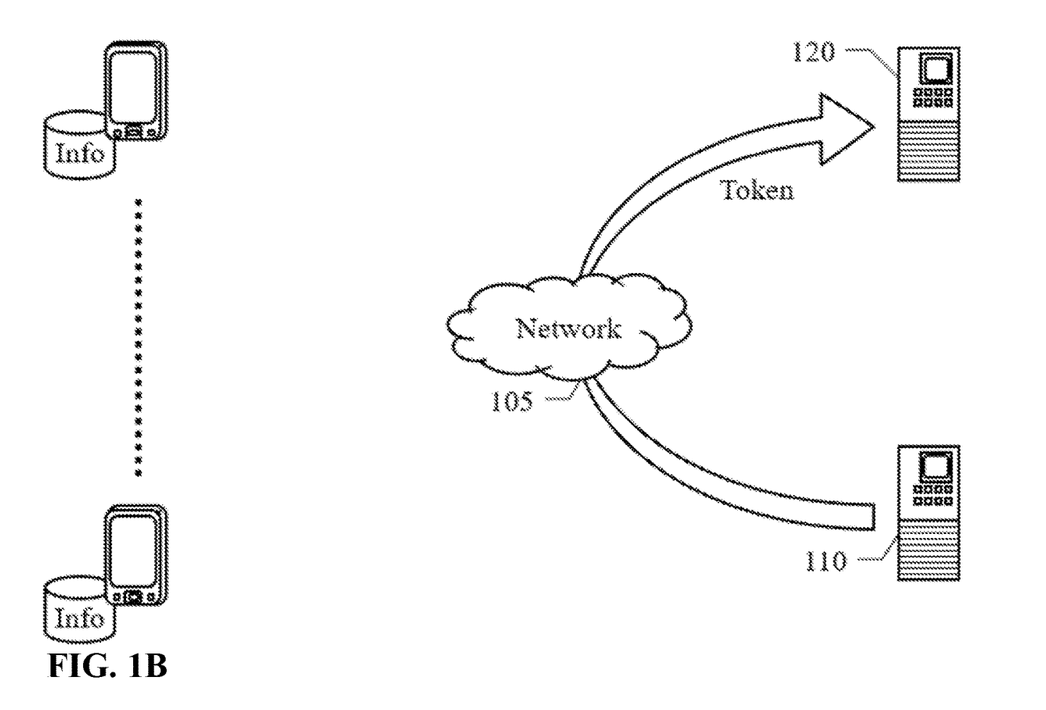

Moving to FIG. 1B, in the solution according to embodiments of the present disclosure the collection entity leverages one or more certification entities that are trusted by it for a certification relating to the information being collected (such as certifying that the source entities are actually in a condition to provide the corresponding pieces of information). In the example at issue, the certification entities are laboratories that perform tests for detecting the infection. Whenever any laboratory determines that an (infected) person is positive to a test for the infection, a certification computing system, such as a certification server 120 of the laboratory, requires a token over the network 105 from the collection server 110 (e.g., a One-Time-Password ("OTP"), a time-based password).

Figure 1C:
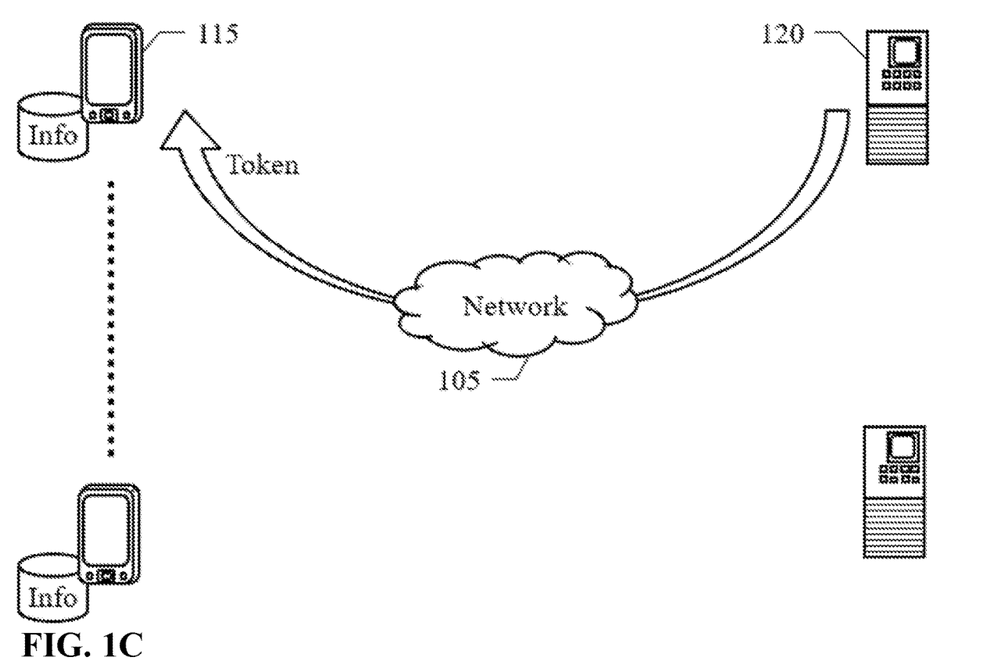

Moving to FIG. 1C, the certification server 120 transmits the token over the network 105 to the smartphone 115 of the infected person. In this way, the laboratory certifies that the infected person is actually so (thanks to the fact that it has been the laboratory itself that has performed his/her test and verifies the infection).

Figure 1D:
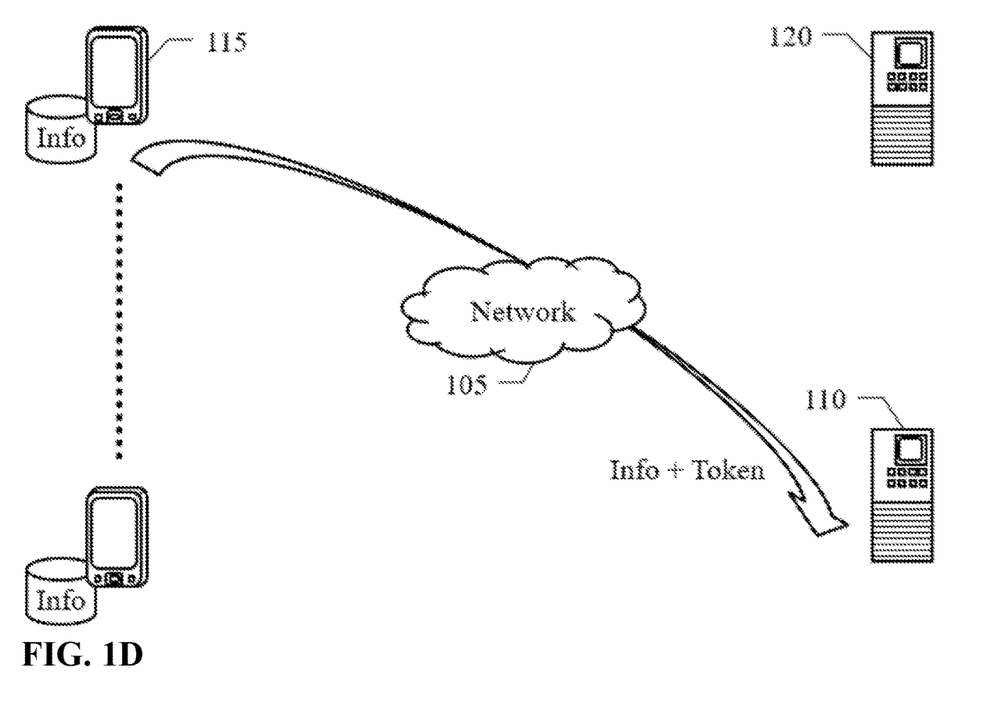

Moving to FIG. 1D, the smartphone 115 of the infected person uploads the corresponding piece of tracing information ("piece of information") over the network 105 to the server 110. However, the tracing information is now uploaded in association with the token that has been received from the certification server 120.

Figure 1E:
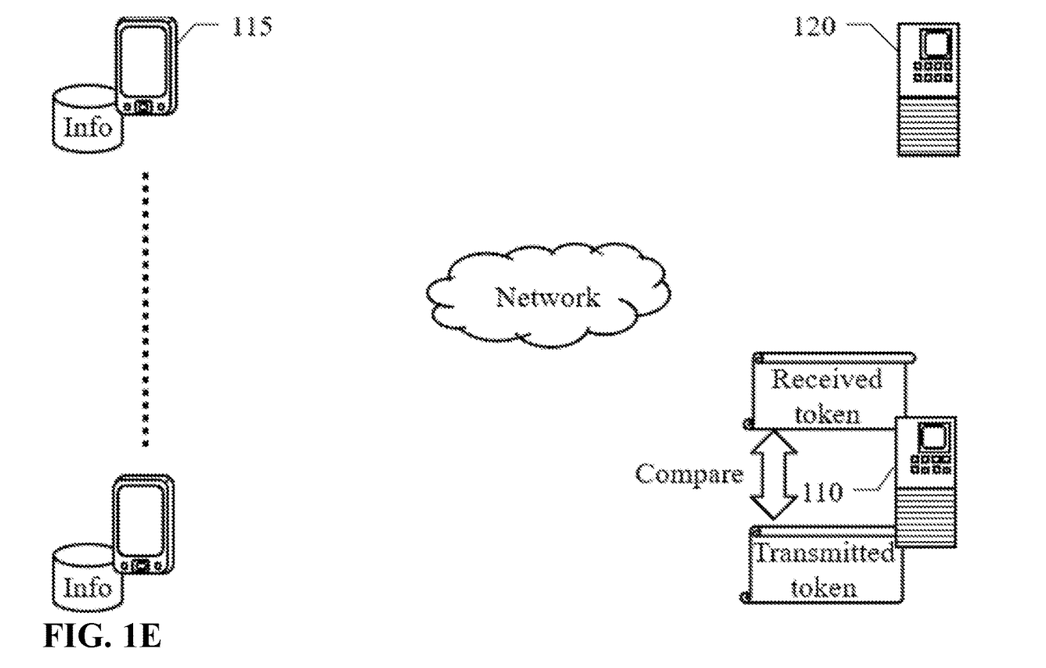

Moving to FIG. 1E, responsively the collection server 110 compares the (received) token that has been received from the smartphone 115 of the infected person with the (transmitted) token that has been transmitted to the certification server 120.

Figure 1F:
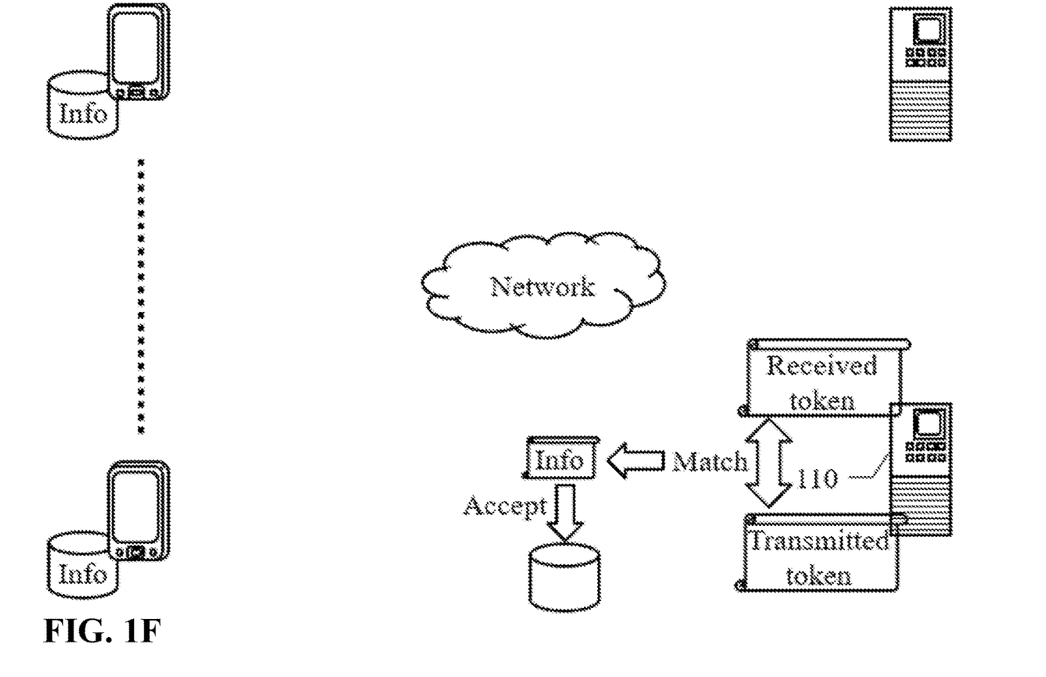

Moving to FIG. 1F, if the received token matches the transmitted token the public health authority is confirmed that the infection of the person has been certified by the laboratory. As a consequence, the public health authority accepts the piece of tracing information (since uploaded by a persons that is actually infected).

The above-described solution allows certifying the correctness of the information being collected in a simple and effective way. Particularly, in this way the task of providing a certification relating to the information being collected is transferred from the collection entity to one or more certification entities. This makes the collection of the information by the collection server faster; in fact, most of the activities relating to the certification have already been performed previously by the certification entities, so that the collection server simply has to verify the match of the received token with the transmitted token. Moreover, the solution is readily scalable, by simply increasing the certification entities.

Moreover, this solution is of general applicability. Particularly, the information may be collected anonymously but at the same time in a certified way. In fact, the certification entities guarantee a certification relating to the information being collected by the collection entities (such as that the corresponding source entities are in a condition to provide it). At the same time, the collection entity does not know the source entities whose information is collected; on the other hand, each certification entity does not have any access to the information that is collected from the source entities that it certifies. As a result, who knows the source entities and who exploits the information collected from them are separated (i.e., the certification entities and the collection entity, respectively).

In the specific application of the contact tracing, the public health authority does not know the infected persons whose tracing information is collected and each laboratory does not have any access to the tracing information that is collected from the persons that it certifies being infected. As a result, it is possible to ensure that the persons declaring to be infected are actually so, thereby avoiding (or at least substantially reducing) the risk of false infected persons. At the same time, this result is achieved with no (or at least substantially reduced) exposures for the privacy and the autonomy of the persons.

Figure 2:
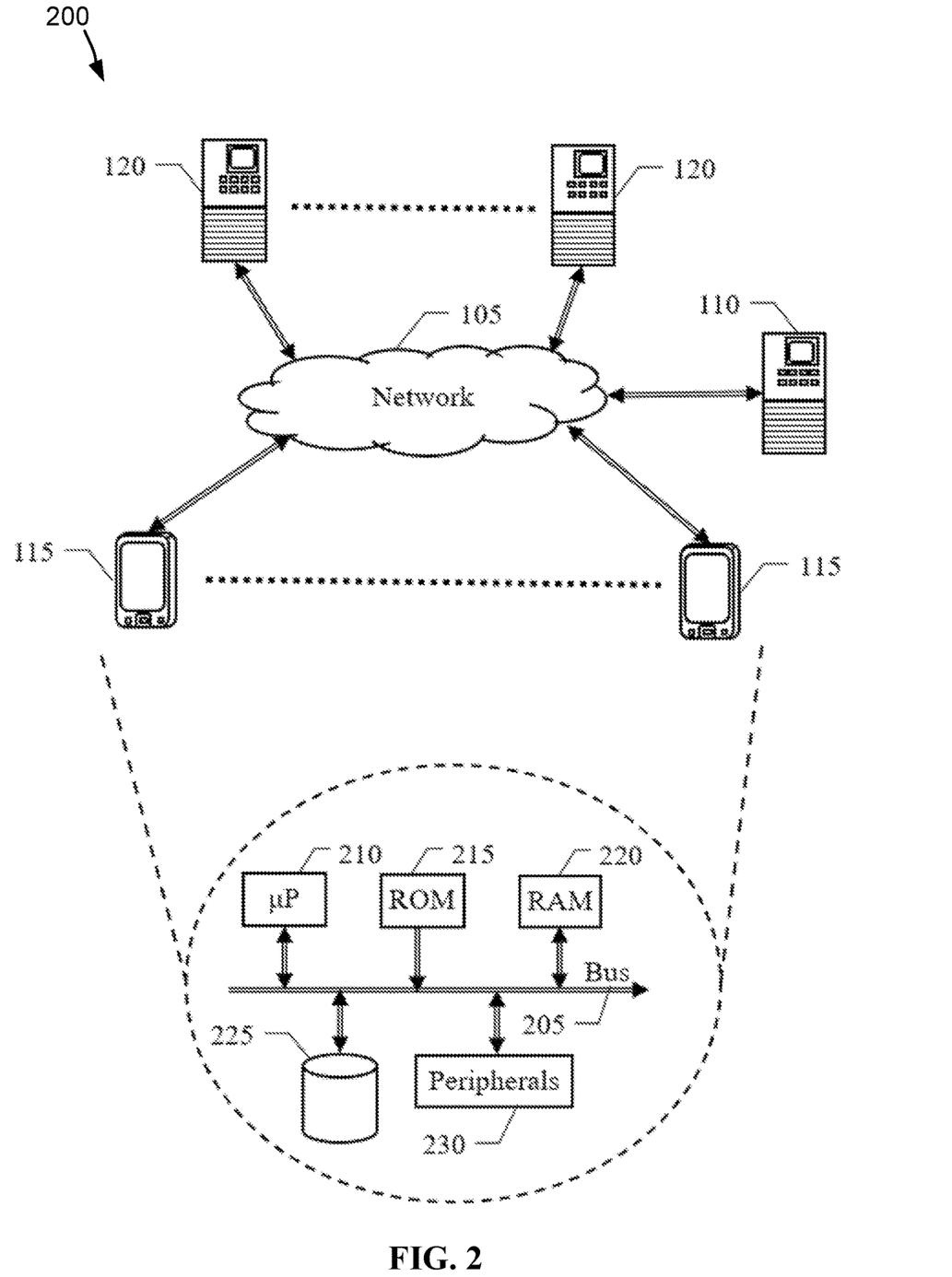
FIG. 2 shows a schematic block diagram of an information technology infrastructure that may be used to implement the solution according to some embodiments of the present disclosure.

With reference now to FIG. 2, a schematic block diagram is shown of an information technology infrastructure (alternatively, system) 200 that may be used to implement the solution according to embodiments of the present disclosure.

The information technology infrastructure 200 comprises the above-mentioned network 105, such as based on the Internet. Moreover, the information technology infrastructure 200 comprises the above-mentioned collection server 110, smartphones (alternatively, source computing systems) 115 and certification servers 120 that communicate among them over the network 105.

Each of these computing systems (i.e., collection server 110, smartphones 115 and certification servers 120) comprises several units that are connected among them through a bus structure 205 at one or more levels (with an architecture that is suitably scaled according to the type of the computing system 110-120). Particularly, a microprocessor (µP) 210, or more, provides a logic capability of the computing system 110-120; a non-volatile memory (ROM) 215 stores basic code for a bootstrap of the computing machine 110-120 and a volatile memory (RAM) 220 is used as a working memory by the microprocessor 210. The computing machine 110-120 is provided with a mass-memory 225 for storing programs and data (for example, storage devices of corresponding data centers wherein they are implemented for the collection/certification servers 110,120 and corresponding flash $E^2PROMs$ for the smartphones 115). Moreover, the computing system 110-120 comprises a number of controllers for peripherals, or Input/Output (I/O) units, 230; for example, as far as relevant to the present disclosure, the peripherals 230 of each collection/certification server 110, 120 comprise a network card for plugging the collection/certification server 110,120 into the corresponding data center and then connecting it to a console of the data center for its control (for example, a personal computer, also provided with a drive for reading/writing removable storage units, such as of USB type) and to a switch/router subsystem of the data center for its communication with the network 105, whereas the peripherals 230 of each smartphone 115 comprise a ("local drive") wireless transceiver (TX/RX), such as of Bluetooth type for communicating with other smartphones 115 locally (e.g., a few feet, twenty feet), a ("remote drive") wireless transceiver (TX/RX), such as of Wi-Fi or mobile telephone type, for accessing the network 105, and a touch-screen for displaying information and entering data/commands.

Figure 3:
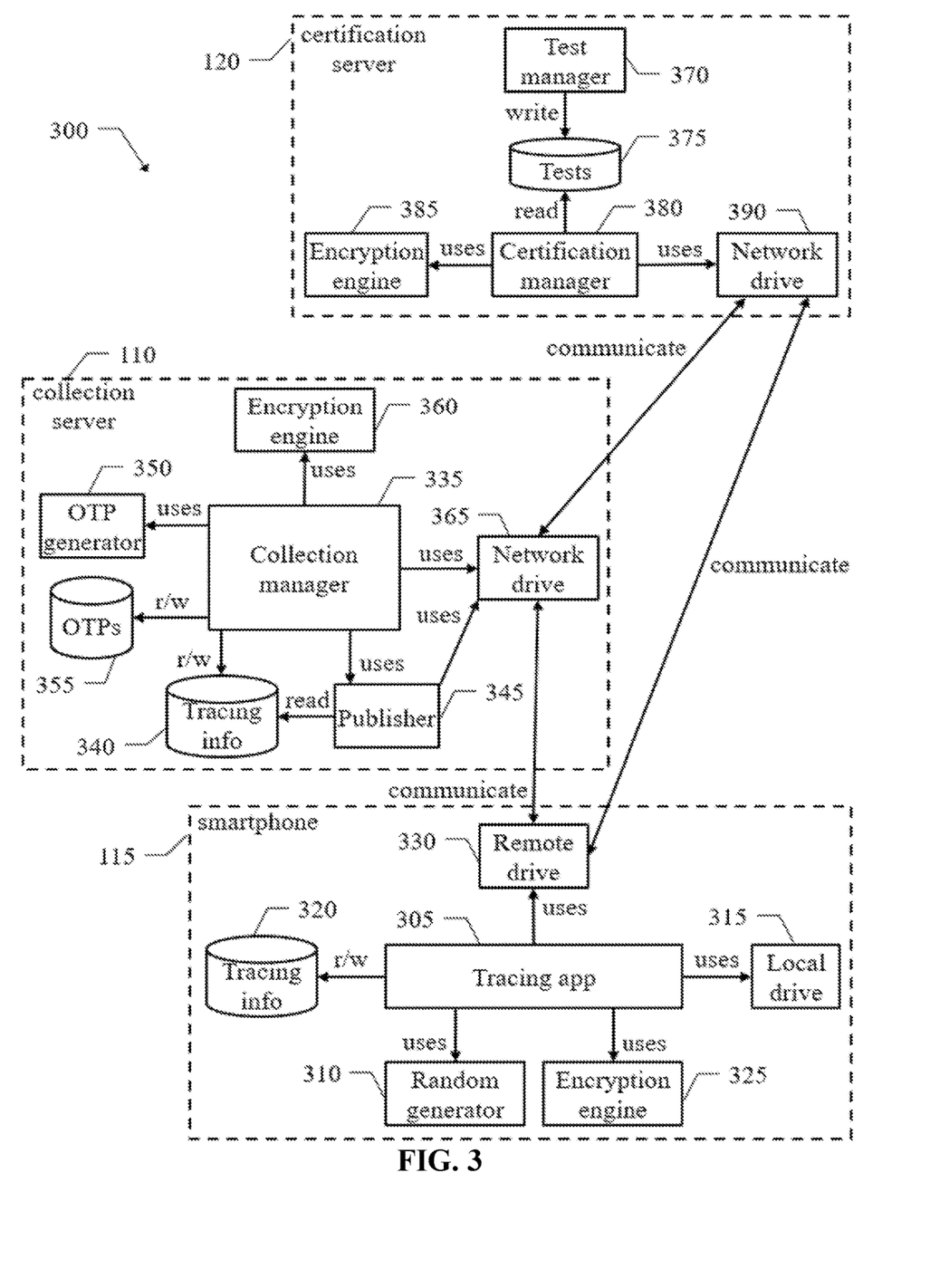
FIG. 3 shows the main software components that may be used to implement the solution according to some embodiments of the present disclosure.

With reference now to FIG. 3, the main software components are shown that may be used to implement the solution according to embodiments of the present disclosure.

Particularly, all the software components (programs and data) are denoted as a whole with the reference 300. The software components are typically stored in the mass memory and loaded (at least partially) into the working memory of each computing system (collection server 110, smartphones 115 and certification servers 120) when the programs are running, together with an operating system and other application programs not directly relevant to the solution of the present disclosure (thus omitted in the figure for the sake of simplicity). The programs are initially installed into the mass memory, for example, from removable storage units or from the Internet. In this respect, each program may be a module, segment or portion of code, which comprises one or more executable instructions for implementing the specified logical function.

Starting from each smartphone 115 (only one shown in the figure), it comprises the following components. A tracing app 305 implements the contact tracing for the person carrying the smartphone 115. For example, the contact tracing is based on a decentralized approach, wherein the tracing app 305 continually broadcasts random messages and receives random messages that are broadcast by other smartphones 115 being nearby. The tracing app 305 has a configuration parameter storing an anonymous code of a person related to a given smartphone 115. The anonymous code (for example, of numerical type) is generated in a way that it is impossible to discover the identity of the person therefrom. The tracing app 305 uses a random generator 310 that generates the random messages to be broadcast in a pseudo-random way, and it uses a local drive 315 that drives the local transceiver for broadcasting/receiving the random messages within a smaller area (e.g., a network that is not connected to the Internet). The tracing app 305 reads/writes a (local) tracing information repository 320 that stores tracing information relating to the smartphone 115. Particularly, the tracing information repository 320 comprises a broadcast message register storing the most recent (broadcast) random messages that have been broadcast and a received message register storing the most recent (received) random messages that have been received from other smartphones of other persons. Both the broadcast message register and the received message register may have a FIFO structure, with a capacity allowing them to save the broadcast (random) messages and the received (random) messages, respectively, over a pre-determined period (for example, in the last 10-20 days). The tracing app 305 uses an encryption engine 325 for encrypting/decrypting information with a private key of the person (stored in a secure way therein). The tracing app 305 uses a remote drive 330 that drives the remote transceiver of the smartphone 115 for communicating over the network with the certification servers 120 and the collection server 110.

Moving to the collection server 110, it comprises the following components. A collection manager 335 manages the collection of the tracing information from the smartphones 115. The collection manager 335 reads/writes a (global) tracing information repository 340 that stores the corresponding pieces of tracing information that have been uploaded to the collection server 110 by the smartphones 115 of the infected persons. Particularly, the tracing information repository 340 has an entry for each infected person, which is indicated by his/her anonymous code. The entry stores the (most recent) pieces of information (e.g., broadcast messages) that have been broadcast by his/her smartphone (in addition to possible service information, such as an indication of a geographical area of the infected person for statistical purposes). In addition, the piece of tracing information of the infected person does not allow discovering his/her identity. A publisher 345 publishes the broadcast messages of the smartphones 115 of the infected persons for their download to the smartphones 115 of the other persons (for use to detect whether they have been in contact with the infected persons). The publisher 345 reads the tracing information repository 340.

In the solution according to embodiments of the present disclosure, the collection manager 335 uses an OTP generator 350, which generates OTPs in a pseudo-random way. The OTPs may include random values (to be used as tokens by the certification servers to certify that the infected persons as actually so), each one being valid only for a single upload of a corresponding piece of tracing information by a (certified) infected person to the collection server 110. The collection manager 335 reads/writes a certification repository 355, which contains information used to certify the infected persons. Particularly, the certification repository 355 has an entry for each collection of a piece of tracing information being in progress. The entry stores the corresponding OTP, its generation time and a unique (laboratory) identifier of the laboratory that certifies the condition of the corresponding infected person. The certification repository 355 may also be purged (such as periodically) to delete the entries having the generation time older than a threshold value (so as to invalidate the corresponding OTPs when they are not used within a corresponding time period). The collection manager 335 uses an encryption engine 360 for encrypting/decrypting information. Both the collection manager 335 and the publisher 345 use a network drive 365 that drives the network card of the collection server 110 for communicating over the network with the certification servers 120 and the smartphones 115.

Moving to each certification server 120 (only one shown in the figure for example purposes, some embodiments contemplate multiple certification servers), it comprises the following components. A test manager 370 manages the tests of the persons for the infection. The test manager 370 writes a test repository 375, which contains information about the tests. Particularly, the test repository 375 has an entry for each test; the entry stores identification information of the person undergoing the test (such as his/her name and possibly telephone number, e-mail address and so on), a date of the test and once the test has been performed its result (positive/negative). A certification manager 380 manages the certification of the infected persons that resulted positive to the test performed by the laboratory. The certification manager 380 reads the test repository 375. The certification manager 380 uses an encryption engine 385 for encrypting/decrypting information with a private key of the laboratory (stored in a secure way therein). The certification manager 380 uses a network drive 390 that drives the network card of the certification server 120 for communicating over the network with the collection server 110 and the smartphones 115.

Figure 4A:
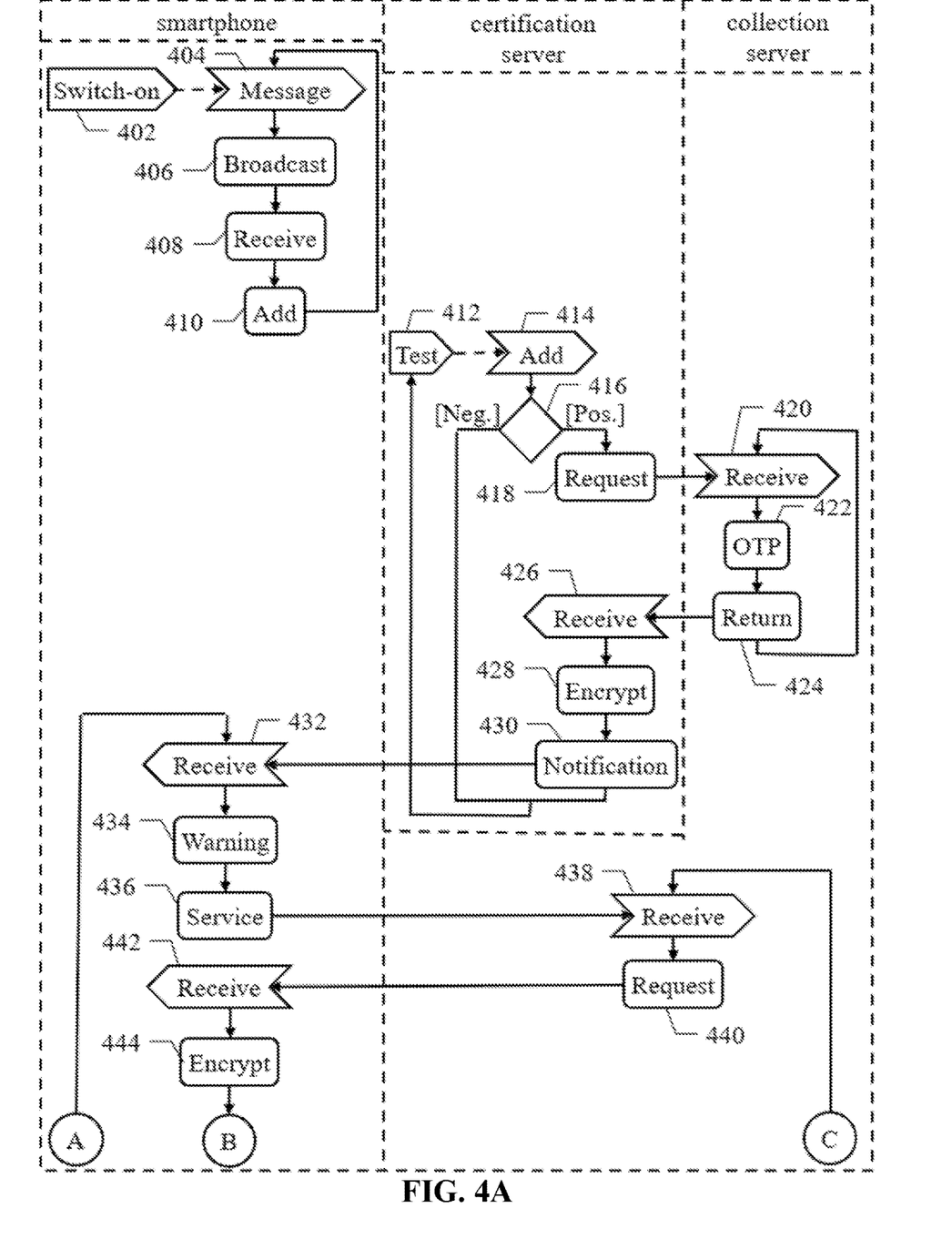
FIG. 4A-FIG. 4B show an activity diagram describing the flow of activities relating to an implementation of the solution according to some embodiments of the present disclosure.
Figure 4B:
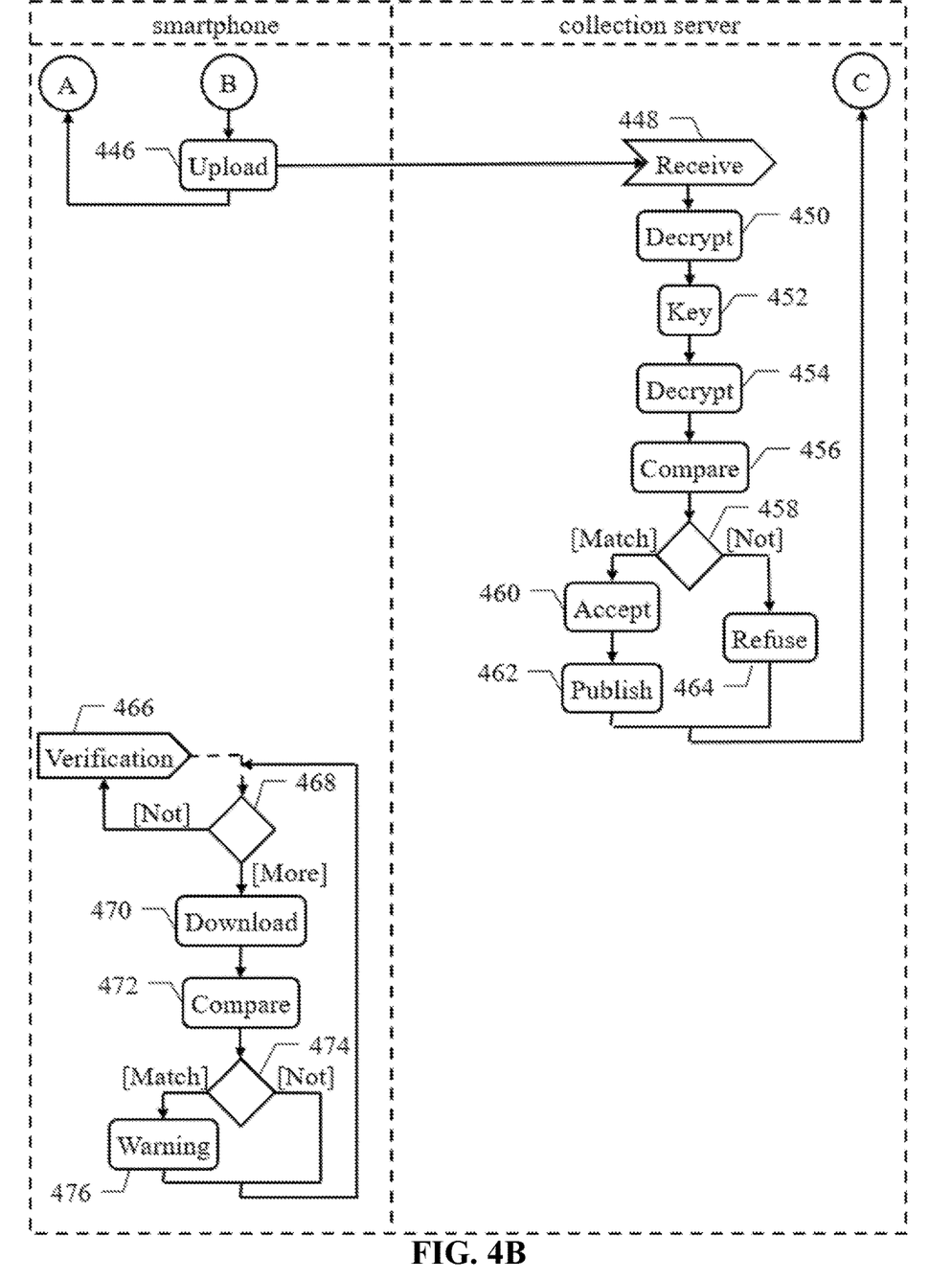

With reference now to FIG. 4A-FIG. 4B, an activity diagram is shown describing the flow of activities relating to an implementation of the solution according to embodiments of the present disclosure.

Particularly, the diagram represents an exemplary contact tracing process with a method 400. In this respect, each block may correspond to one or more executable instructions for implementing the specified logical function by the corresponding computing systems (smartphones, certification serves and control server).

Starting from the swim-lane of the smartphone of a generic person (only one shown in the figure, but the depicted activity is also contemplated from the perspective of many smartphones), the process passes from block 402 to block 404 as soon as the smartphone is switched on. Responsively, the tracing app enters an endless loop for logging the corresponding tracing information. Particularly, the tracing app commands the random generator to generate a (new) random message, which is added to the broadcast message register of the tracing information repository, initially empty (by writing it into a head entry after shifting its content by one entry towards a tail thereby losing the content of a head entry). The tracing app at block 406 broadcasts the random message (via the local drive); the random message has a limited propagation range (for example, 2-5 m around the smartphone), so that it may be received only by other smartphones that are nearby. The tracing app at block 408 listens for any random messages that may have been broadcast by other smartphones in close proximity thereto (via the local drive); the tracing app at block 410 adds any random message being received to the received message register of the tracing information repository, initially empty (by writing it into a head entry after shifting its content by one entry towards a tail thereby losing the content of a head entry). The flow of activity then returns to the block 404 for repeating the same operations continuously (for example, every 5-30 s).

With reference now to the swim-lane of the certification server of a generic laboratory (only one shown in the figures but multiple certification servers may be used in embodiments), the process passes from block 412 to block 414 as soon as a test of a person has been executed. At this point, the test manager adds a new entry to the test repository with the information about the test. The flow of activity branches at block 416 according to a result of the test. If the person has been found positive to the infection, the certification manager at block 418 submits an (OTP) request to the collection server (via the network drive) for a (new) OTP to be used for uploading the piece of tracing information of the (infected) person. For this purpose, the certification server authenticates with the collection server, for example, via a laboratory identifier and a password; this allows the collection server to identify the laboratory (as one being trusted by the public health authority).

Moving to the swim-lane of the collection server of the public health authority, the collection manager (being in a listening condition) receives the OTP request at block 420 (via the network drive). Responsively, the collection manager at block 422 commands the OTP generator to generate a (new) OTP; the collection manager then adds a (new) entry to the certification repository containing the OTP so generated, its generation time (set to a current time) and the laboratory identifier (derived from the corresponding authentication). The collection manager at block 424 returns the OTP to the certification server (via the network drive). The process then goes back to the block 420 waiting for a next OTP request.

With reference again to the swim-lane of the certification server, the certification manager (being in a listening condition) receives the OTP at block 426 (via the network drive). Responsively, the certification manager at block 428 commands the encryption engine to encrypt the OTP with the private key of the laboratory. The certification manager at block 430 submits an (infection) notification to the smartphone of the infected person (via the network drive) for informing the infected person of the positive result of the test. The infection notification may contain the laboratory identifier and the encrypted OTP. The flow of activity then returns from the block 430 or directly from the block 416 if the result of the test is negative to the block 412 waiting for the execution of a next test.

Moving to the swim-lane of the smartphone of the infected person (the same one as above in the figure for the sake of simplicity), the tracing app (being in a listening condition) receives the infection notification at block 432 (via the remote drive). Responsively, the tracing app at block 434 outputs a warning message (for example, by displaying a corresponding notification through a display of the smartphone, by generating an audible notification through a speaker of the smartphone) informing the infected person that s/he has been found positive to the infection. The warning message may also indicate one or more best practices for the infected person (e.g., the person should remain isolated, the person should contact his/her doctor for a corresponding treatment). The tracing app then uploads the relevant piece of tracing information to the collection server, i.e., the broadcast messages (possibly after requesting a manual confirmation to the infected person). For this purpose, the tracing app at block 436 transmits service information to the collection server (via the remote drive); the service information contains the public key of the smartphone (retrieved from the encryption engine) and possibly the anonymous code of the person.

Moving to the swim-lane of the collection server, the collection manager (being in a listening condition) receives the service information at block 438 (via the network drive). Responsively, the collection manager at block 440 submits an (upload) request for uploading the piece of tracing information to the smartphone (via the network drive).

Returning to the swim-lane of the smartphone, the tracing app (being in a listening condition) receives the upload request at block 442 (via the remote drive). Responsively, the tracing app at block 444 commands the encryption engine to encrypt the broadcast messages (retrieved form the corresponding register of the tracing information repository), the laboratory identifier and the (laboratory-)encrypted OTP (extracted from the infection notification) with the private key of the person. The tracing app at block 446 uploads uploading information to the collection server (via the remote drive); the uploading information contains the broadcast messages, the laboratory identifier and the (laboratory-)encrypted OTP being all encrypted with the private key of the person, together with the anonymous code of the person if not already provided with the service information. The flow of activity then returns to the block 432 waiting for a next infection notification.

Moving to the swim-lane of the collection server, the collection manager (being in a listening condition for it) receives the uploading information at block 448 (via the network drive). Responsively, the collection manager at block 450 commands the encryption engine to decrypt the uploading information with the public key of the person (extracted from the service information), so as to restore the broadcast messages, the laboratory identifier, and the (laboratory-)encrypted OTP. The collection manager at block 452 retrieves the public key of the laboratory being associated with the laboratory identifier, for example, from a public register or directly from its certification server. The collection manager at block 454 commands the encryption engine to decrypt the (laboratory-)encrypted OTP with the public key of the laboratory. The collection manager at block 456 compares the (received, e.g., received from the smartphone) OTP so obtained with the (transmitted) one or more OTPs being transmitted to the certification server of the laboratory still to be used (retrieved from the certification repository according to the laboratory identifier). The flow of activity branches at block 458 according to a result of this comparison. If a transmitted OTP is found matching the received OTP, the collection manager at block 460 accepts the uploading of the piece of information defined by the broadcast messages from the smartphone (since the condition of the corresponding infected person is certified by the laboratory); at the same time, the collection manager removes the entry of the (matching) transmitted OTP from the certification repository. Particularly, the collection manager adds a (new) entry to the tracing information repository containing the anonymous code of the infected person and the broadcast messages. The collection manager at block 462 publishes the broadcast messages of the infected person (for example, in a web site being freely accessible). Since the broadcast messages are random, no information may be disclosed about the infected person (and particularly his/her identity and movements). Referring back to the block 458, if no transmitted OTP is found matching the received OTP, the collection manager at block 464 refuses the uploading of the piece of information from the smartphone (possibly performing additional operations, such as blocking the tracing app of the smartphone by flagging it as unreliable). In both cases, the flow of activity returns from the block 462 or from the block 464 to the block 438 waiting for the uploading of a next piece of tracing information.

With reference again to the swim-lane of the (generic) smartphone, in a completely independent way the process passes from block 466 to block 468 whenever a (verification) event occurs triggering the verification of the broadcast messages of (new) infected persons (for example, periodically, such as every 1-4 hours or in response to each publication thereof). Responsively, the tracing app verifies whether the broadcast messages of any new infected person (published after a last verification thereof) still remain to be verified. If so, the tracing app at block 470 downloads the broadcast messages of a (current) new infected person from the collection server, for example, in chronological order of publication (via the remote drive). The tracing app at block 472 compares the broadcast messages of the new infected person with the received messages in the corresponding register of the tracing information repository. The flow of activity branches at block 474 according to a result of this verification. If a significant match is found between the broadcast messages of the new infected person and the received messages (for example, when a number of broadcast messages of the new infected person being found in the received messages reaches a threshold value, such as 50-100 over at least 5-10 minutes), this means that the person has been in contact with the infected person for a time sufficient to be infected by him/her. Therefore, the tracing app at block 476 outputs a warning message (for example, by displaying a corresponding notification) informing the person that s/he may have been infected (and then s/he has to execute a test for the infection and to remain in quarantine). In this way, it is possible to determine that the person has been in contact with infected persons without knowing any information about them (and particularly their identities and the places where they have been encountered). The flow of activity then returns from the block 476 or directly from the block 474 if no significant match has been found to the block 468 for repeating the same operations. With reference again to the block 468, when the broadcast messages of no new infected person remain to be verified (always true if the broadcast messages of no new infected person have been published) the flow of activity returns to the block 466 waiting for the occurrence of a next verification event.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, some embodiments provide a method for collecting information. However, the information may be collected in any way and for any purpose (for example, either anonymously or not, for tracing, monitoring, survey, analysis and so on purposes).

In some embodiments, the information is collected over a telecommunication network. However, the information may be collected in any way (for example, in push mode, in pull mode and so on) over any telecommunication network (for example, a global, wide area, local network, exploiting any type of wired and/or wireless connections, such as of metal wire, optical fiber, Wi-fi, mobile telephone or satellite type, and so on).

In some embodiments, the method comprises the following steps under the control of a collection computing system of a collection entity. However, the collection computing system may be of any type (see below) and of any collection entity (for example, a public authority, a private organization and so on).

In some embodiments, the method comprises transmitting (by the collection computing system) a token over the telecommunication network. However, the token may be of any type (for example, an OTP, a progressive number and so on) and it may be transmitted in any way (for example, in plain text, encrypted and so on).

In some embodiments, the token is transmitted to a certification computing system of a certification entity. However, the certification computing system may be of any type (for example, a server, a virtual machine, a cloud service and so on) and of any certification authority (for example, a laboratory, a government agency, a notary public and so on).

In some embodiments, the method comprises receiving (by the collection computing system) a piece of information in association with the token over the telecommunication network. However, the piece of information may be of any type (for example, tracing information, monitoring information, usage information and so on) and it may be received in any way (for example, in plain text, encrypted and so on) in association with the token (for example, together, separate from each other and so on).

In some embodiments, a certification relating to the piece of information is granted by the certification entity transmitting the token from the certification computing system to the source computing system. However, the certification may relate to the piece of information in any way (for example, for a condition of the source entity to provide the piece of information, a content of the piece of information and so on).

In some embodiments, the method comprises accepting (by the collection computing system) the piece of information according to a match of the token being received with the token being transmitted. However, the piece of information may be accepted according to any match of the received token with the transmitted token (for example, simply when they are the same, further requiring that the token is received within an expiration period from its transmission, and so on) and for any purpose (for example, its publication, logging, analysis and so on).

Further embodiments provide additional advantageous features, which may however be omitted at all in a basic implementation.

Particularly, in some embodiments the method comprises receiving (by the collection computing system) the piece of information over the telecommunication network in association with the token from the source computing system anonymously with the source entity being unknown to the collection entity. However, the piece of information may be received anonymously in any way (for example, with the source entity indicated by any anonymous code, without any indication of the source entity and so on). In any case, the possibility is not excluded of applying the same solution even to the (non-anonymous) collection of information from source entities that are known to the collection entity (for example, simply for delegating the corresponding certifications to one or more certification entities).

In some embodiments, the method comprises receiving (by the collection computing system) the piece of information over the telecommunication network in association with the token from the source computing system with the token being provided from the certification computing system to the source computing system to certify that the source entity is in a condition to provide the piece of information being unknown to the certification entity. However, the condition of the source entity may be of any type (for example, being found positive to an infection, owning the piece of information, generating the piece of information, measuring the piece of information and so on).

In some embodiments, the method is for collecting tracing information in a contact tracing process. However, the contact tracing process may be of any type (for example, decentralized or centralized, forward and/or backward tracing, and so on).

In some embodiments, the source entity is an infected person being found positive to an infection. However, the infection may be of any type (for example, COVID-19, HIV/AIDS, Dengue Fever, Tuberculosis and so on).

In some embodiments, the piece of information is a piece of tracing information of the infected person. However, the piece of tracing information may be of any type (for example, random messages being broadcast by the source computing system, positions of the source computing system being detected by a geo-localization system, such as GPS, locations detected by scanning corresponding identification codes on entering therein, such as QR-codes, and so on).

In some embodiments, the source computing system is a mobile computing device of the infected person. However, the mobile computing device may be of any type (for example, a smartphone, a smartwatch and so on).

In some embodiments, the method comprises receiving (by the collection computing system) the piece of tracing information over the telecommunication network from the mobile computing device of the infected person being found positive to the infection by the verification entity being an analysis laboratory. However, the analysis laboratory may be of any type (for example, a public/private hospital, a diagnostic center and so on).

In some embodiments, the method comprises causing (by the collection computing system) corresponding further mobile computing devices of one or more contacted persons having been in contact with the infected person according to the tracing information to warn the corresponding contacted persons. However, the contacted persons may be determined in any way (for example, locally, centrally and so on) and they may be warned in any way (for example, by displaying messages, sending e-mails and so on) via any further mobile computing devices (see above). In any case, the possibility is not excluded of warning the contacted persons on other personal computing systems thereof being different from the ones used to collect the tracing information (for example, tablets, laptops, desktops and so on).

In some embodiments, the method comprises receiving (by the collection computing system) the piece of tracing information over the telecommunication network comprising a plurality of broadcast random messages being broadcast by the mobile computing device. However, the random messages may be of any type (for example, numeric, alphanumerical and so on) and they may have been broadcast in any way (for example, via any technology, such as Bluetooth, BLE and the like, over any diffusion range, with any frequency and so on).

In some embodiments, the method comprises publishing (by the collection computing system) the broadcast random messages over the telecommunication network. However, the broadcast random messages may be published in any way (for example, making them available for download, transmitting them upon request and so on).

In some embodiments, this is for causing each of the further mobile computing devices to recognize the corresponding contacted person as having been in contact with the infected person according to a match of the broadcast random messages with a plurality of received random messages being received by the further mobile computing device. However, the match may be determined in any way (for example, according to any number, frequency, period and so on of the received messages equal to the broadcast messages).

In some embodiments, the method comprises receiving (by the collection computing system) the piece of information over the telecommunication network in association with an encrypted token being equal to the token encrypted with a private key of the certification entity. However, the token may also be encrypted in another way (for example, with a symmetric key being exchanged previously between the certification entity and the collection entity, and so on) or even not at all.

In some embodiments, the method comprises restoring (by the collection computing system) the token from the encrypted token with a public key of the certification entity.

However, the public key of the certification entity may be retrieved in any way (for example, according to its identifier received from the source computing system, received from the certification computing system at the transmission thereto of the token, downloaded in advance and so on).

In some embodiments, the method comprises receiving (by the collection computing system) the piece of information over the telecommunication network in association with a certification identifier of the certification entity. However, the certification identifier may be of any type (for example, local part and domain, IP address and so on) and it may be received in association with the piece of information in any way (for example, together, separate from each other and so on).

In some embodiments, the method comprises retrieving (by the collection computing system) the public key of the certification entity according to the certification identifier. However, the public key of the certification entity may be retrieved in any way (for example, downloaded from a public register, requested to the certification computing system and so on).

In some embodiments, the method comprises receiving (by the collection computing system) a public key of the source entity over the telecommunication network. However, the public key of the source entity may be received in any way (for example, transmitted from the source computing system, retrieved according to an identifier of the source entity and so on).

In some embodiments, the method comprises receiving (by the collection computing system) an encrypted piece of information equal to the piece of information encrypted with a private key of the source entity. However, the piece of information may also be encrypted in another way (for example, with a symmetric key being exchanged previously between the source entity and the collection entity, and so on) or even not at all.

In some embodiments, the method comprises restoring (by the collection computing system) the piece of information by decrypting the encrypted piece of information with the public key of the source entity. However, the encrypted piece of information may be decrypted in any way (according to its encryption).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

Some embodiments provides a computer program that is configured for causing a computing system to perform the method of above when the computer program is executed on the computing system. Some embodiments provides a computer program product that comprises one or more computer readable storage media having program instructions collectively stored in said one or more computer readable storage media, the program instructions readable by the computing system to cause the computing system to perform the same method. However, the program may be implemented as a stand-alone module, as a plug-in for a pre-existing program (for example, the collection manager) or even directly in the latter; moreover, the program may take any form suitable to be used by any computing system.

Some embodiments provides a system comprising means that are configured for performing the steps of the above-described method. Some embodiments provides a system comprising a circuitry (i.e., any hardware suitably configured, for example, by software) for performing each step of the same method. However, the system may be of any type (for example, a server, a virtual machine, a cloud service, a PC and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for collecting information over a telecommunication network, wherein the method comprises, under control of a collection computing system of a collection entity:
   receiving a piece of information from a source computing system, wherein the piece of information is generated such that an identity of a source entity associated with the source computing system is unknown to the collection entity;
   generating, by the collection computing system and responsive to receiving the piece of information from the source computing system, a token for certifying the piece of information;
   transmitting, by the collection computing system, the generated token for certifying the piece of information over the telecommunication network to a certification computing system of a certification entity;
   receiving, by the collection computing system, from the source computing system, the piece of information and an encrypted version of the generated token, wherein the encrypted version of the generated token is encrypted by the certification entity with a private key of the certification entity and was transmitted by the certification computing system to the source computing system;
   decrypting, by the collection computing system, the encrypted version of the generated token to derive a decrypted version of the generated token; and
   certifying, by the collection computing system, responsive to the decrypted version of the generated token matching the generated token transmitted to the certification computing system, the piece of information as accurate and storing the piece of information within the collection computing system.

2. The method according to claim 1, wherein the source entity is an infected person identified to have a positive result of an infection by the certification entity, wherein the piece of information is tracing information of the infected person, wherein the source computing system is a mobile computing device of the infected person.

3. The method according to claim 2, wherein the certification entity is an analysis laboratory that performed a test to obtain the positive result of the infection of the infected person.

4. The method according to claim 2, wherein the method comprises:
   identifying, by the collection computing system, one or more additional source computing devices that have been in contact with the infected person based on the tracing information; and
   causing, by the collection computing system, warning notifications to be sent to the one or more additional source computing devices to warn respective ones of the one or more additional source computing devices of the contact with the infected person based on the tracing information.

5. The method according to claim 2, wherein the tracing information comprises a plurality of broadcast random messages broadcasted by the mobile computing device, wherein the method comprises:
   publishing, by the collection computing system, the broadcast random messages over the telecommunication network such that respective users of one or more additional source computing devices can determine that a contact event occurred with the infected person according to a subset of broadcast random messages the one or more additional source computing devices received during a first time period matching the published broadcast random messages.

6. The method according to claim 1, wherein a public key of the certification entity used to decrypt the encrypted version of the generated token is retrieved by the collection computing system according to a certification identifier of the certification entity.

7. The method according to claim 1, wherein the piece of information is encrypted by a private key of the source entity prior to transmission to the collection computing system, wherein the piece of information is required to be decrypted by the collection computing system using a public key of the source entity prior to the storing the piece of information within the collection computing system.

8. A computer program product for collecting information over a telecommunication network, the computer program product comprising one or more computer readable storage media having program instructions collectively stored in said one or more computer readable storage media, the program instructions readable by a collection computing system of a collection entity to cause the collection computing system to perform a method comprising:
   receiving, a piece of information from a source computing system, wherein the piece of information is generated such that an identity of a source entity associated with the source computing system is unknown to the collection entity;
   generating, responsive to receiving the piece of information from the source computing system, a token for certifying the piece of information;
   transmitting the generated token for certifying the piece of information over the telecommunication network to a certification computing system of a certification entity;
   receiving, from the source computing system, the piece of information and an encrypted version of the generated token, wherein the encrypted version of the generated token is encrypted by the certification entity with a private key of the certification entity and was transmitted by the certification computing system to the source computing system;
   decrypting the encrypted version of the generated token to derive a decrypted version of the generated token; and
   certifying that the piece of information is accurate responsive to the decrypted version of the generated token matching the generated token transmitted to the certification computing system and storing the piece of information within the collection computing system.

9. The computer program product according to claim 8, wherein the source entity is an infected person identified to have a positive result of an infection by the certification entity, wherein the piece of information is tracing information of the infected person, wherein the source computing system is a mobile computing device of the infected person.

10. The computer program product according to claim 9, wherein the certification entity is an analysis laboratory that performed a test to obtain the positive result of the infection of the infected person.

11. A collection computing system of a collection entity comprising:
one or more processors; and
one or more computer-readable storage media collectively storing program instructions which, when executed by the one or more processors, are configured to cause the one or more processors to perform a method comprising:
receiving a piece of information from a source computing system, wherein the piece of information is generated such that an identity of a source entity associated with the source computing system is unknown to the collection entity;
generating, responsive to receiving the piece of information from the source computing system, a token for certifying the piece of information;
transmitting the generated token for certifying the piece of information over the telecommunication network to a certification computing system of a certification entity;
receiving, from the source computing system, the piece of information and an encrypted version of the generated token, wherein the encrypted version of the generated token is encrypted by the certification entity with a private key of the certification entity and was transmitted by the certification computing system to the source computing system;
decrypting the encrypted version of the generated token to derive a decrypted version of the generated token; and
certifying, responsive to the decrypted version of the generated token matching the generated token transmitted to the certification computing system, the piece of information as accurate and storing the piece of information within the collection computing system.

12. The system of claim 11, wherein the source entity is an infected person identified to have a positive result of an infection by the certification entity, wherein the piece of information is tracing information of the infected person, wherein the source computing system is a mobile computing device of the infected person.

13. The system of claim 12, wherein the certification entity is an analysis laboratory that performed a test to obtain the positive result of the infection of the infected person.

14. The system according to claim 12, wherein the computer-readable storage media stores additional program instructions which, when executed by the one or more processors, are configured to cause the one or more processors to perform:
identifying one or more additional source computing devices that have been in contact with the infected person based on the tracing information; and
causing warning notifications to be sent to the one or more additional source computing devices to warn respective ones of the one or more additional source computing devices of the contact with the infected person based on the tracing information.

15. The system according to claim 12, wherein the tracing information comprises a plurality of broadcast random messages broadcasted by the mobile computing device, wherein the computer-readable storage media stores additional program instructions which, when executed by the one or more processors, are configured to cause the one or more processors to perform:
publishing the broadcast random messages over the telecommunication network such that respective users of one or more additional source computing devices can determine that a contact event occurred with the infected person according to a subset of broadcast random messages the one or more additional source computing devices received during a first time period matching the published broadcast random messages.

* * * * *